United States Patent
Froese

(10) Patent No.: US 9,694,762 B2
(45) Date of Patent: Jul. 4, 2017

(54) CHECK-LINK HARNESS GUIDE

(71) Applicant: Nissan North America, Inc., Franklin, TN (US)

(72) Inventor: Matthew Froese, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 15/082,886

(22) Filed: Mar. 28, 2016

(65) Prior Publication Data

US 2016/0207481 A1 Jul. 21, 2016

Related U.S. Application Data

(63) Continuation of application No. 14/497,094, filed on Sep. 25, 2014, now Pat. No. 9,321,414.

(51) Int. Cl.
*B62D 27/00* (2006.01)
*B60R 16/02* (2006.01)
*B62D 27/02* (2006.01)

(52) U.S. Cl.
CPC ...... *B60R 16/0215* (2013.01); *B60R 16/0222* (2013.01); *B62D 27/023* (2013.01)

(58) Field of Classification Search
CPC ............ B60R 16/0215; B60R 16/0222; B60R 27/023
See application file for complete search history.

(56) References Cited

U.S. PATENT DOCUMENTS

| | | |
|---|---|---|
| 5,897,157 A | 4/1999 | Yamaguchi et al. |
| 7,202,415 B2 | 4/2007 | Fujita |
| 2002/0112317 A1 | 8/2002 | Hayashi |

FOREIGN PATENT DOCUMENTS

| | | |
|---|---|---|
| EP | 2677613 A1 | 12/2013 |
| JP | 10-114224 A | 5/1998 |
| JP | 4412150 A | 5/2006 |
| JP | 2013-226961 A | 11/2013 |
| WO | 2012-120719 A1 | 9/2012 |
| WO | 2012-120720 A1 | 9/2012 |

*Primary Examiner* — Lori L Lyjak
(74) *Attorney, Agent, or Firm* — Global IP Counselors, LLP

(57) ABSTRACT

A vehicle body structure includes first and second body structures defining first and second interior cavities. A mounting portion of the base member is fixed to the first body structure. A guide member is fixed to the second body structure. A channel member is movably received by the guide member. A first end of the channel member is rotatably fixed to a receiving portion of the base member and defines a first end opening such that the receiving portion extends into the first end opening. A second end is positioned within the second interior cavity and defines a second end opening with a channel extending from the first end opening to the second end opening. The channel member extends across an exterior space between the first and second body structures. A wiring harness passes through the channel from the first interior cavity to the second interior cavity.

20 Claims, 8 Drawing Sheets

CHECK-LINK HARNESS GUIDE

CROSS-REFERENCE TO RELATED APPLICATION

This application is a continuation of U.S. patent application Ser. No. 14/497,094, filed on Sep. 25, 2014. The entire contents of U.S. patent application Ser. No. 14/497,094 are hereby incorporated herein by reference in their entirety.

BACKGROUND

Field of the Invention

The present invention generally relates to a wiring harness guide for a vehicle. More specifically, the present invention relates to a harness guide pivotally connected at a first body structure and movably received within an interior cavity of a second body structure.

Background Information

Many vehicles have closure panels that include electrically powered fixtures. Vehicle doors are one example of a closure panel that can include such electrically powered accessories, such as electric door locks, electric side rear view mirror, etc. Typically, a hole is formed in a portion of the vehicle body panel, and another hole is formed in the closure panel. Electrical wires extend through both holes to provide electric power from the vehicle body to the accessories on or in the closure panel.

The electrical wires extending between the vehicle body and closure panel are typically protected at the vehicle body and the closure panel by a flexible conduit or hollow tube-shaped grommet. More specifically, the grommets have mounting ends that extend into the respective holes in the vehicle body and the closure panel. The wires extend through the grommets. The grommets are shaped and dimensioned such that the electrical wires are prevented from contacting edges of the holes in the vehicle body and the closure panel, such that the insulation on the wires is protected and electrical shorting to metallic portions of the vehicle body is substantially prevented.

Typically, grommets are disposed at the vehicle body and closure panel with a wiring harness passing through both grommets. The harness should be long enough to span the distance between the closure panel and the vehicle body when the closure panel is in an open position. When the closure panel is in a closed position, the harness is routed to a space between the closure panel and the vehicle body. However, the hinge and/or the grommets can pinch the harness when the harness is not properly routed when moving the closure panel to the closed position, which can result in damage to the electrical wires. Additionally, space between the closure panel and the vehicle body is limited, thereby increasing the difficulty of routing the wiring harness therebetween. Further, the grommets are typically disposed at different heights, thereby increasing the likelihood of the afore-mentioned disadvantages.

Accordingly, a need exists for an improved wiring harness guide.

SUMMARY

In view of the state of the known technology, one aspect of the present invention includes a check-link harness guide for a vehicle. A vehicle body structure includes a first body structure defining a first interior cavity and a second body structure defining a second interior cavity, with one of the first and second body structures being pivotally connected and movable relative to the other of the first and second body structures to define an open configuration and a closed configuration. A base member has a mounting portion and a receiving portion extending from the mounting portion. The mounting portion is fixed to the first body structure. A guide member is fixed to the second body structure. A channel member is movably received by the guide member. The channel member having a first end rotatably fixed to the receiving portion of the base member and defining a first end opening such that the receiving portion of the base member extends into the first end opening, and a second end positioned within the second interior cavity and defining a second end opening with a channel extending from the first end opening to the second end opening, the channel member extending across an exterior space between the first and second body structures; and a wiring harness passing through the channel of the channel member from the first interior cavity to the second interior cavity.

Another aspect of the present invention includes a body structure defining an interior body cavity and a door opening. A door structure defines an interior door cavity. The door is pivotally connected to the body structure and movable between an open position in which the door exposes the door opening, and a closed position in which the door covers the door opening. A base member has a mounting portion fixed to the body structure, and a receiving portion extending from the mounting portion. The receiving portion of the base member has a substantially flat upper wall, a substantially flat lower wall, and a pair of arcuate side walls. A guide member is fixed to the door structure. A channel member is rotatably fixed to the receiving portion of the base member and movably received by the guide member. The channel member has a first end defining a first end opening, with the receiving portion of the base member extending into the first end opening such that the pair of arcuate side walls accommodate pivotal movement of the first end of the channel member relative to the receiving portion of the base member. A second end positioned within the interior door cavity and defining a second end opening, with a channel extending from the first end opening to the second end opening. The channel member extends across an exterior space between the body and door structures. A wiring harness passing through the channel of the channel member from the interior body cavity to the interior door cavity. A pivot structure rotatably connects the first end of the channel to the receiving portion of the base member.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
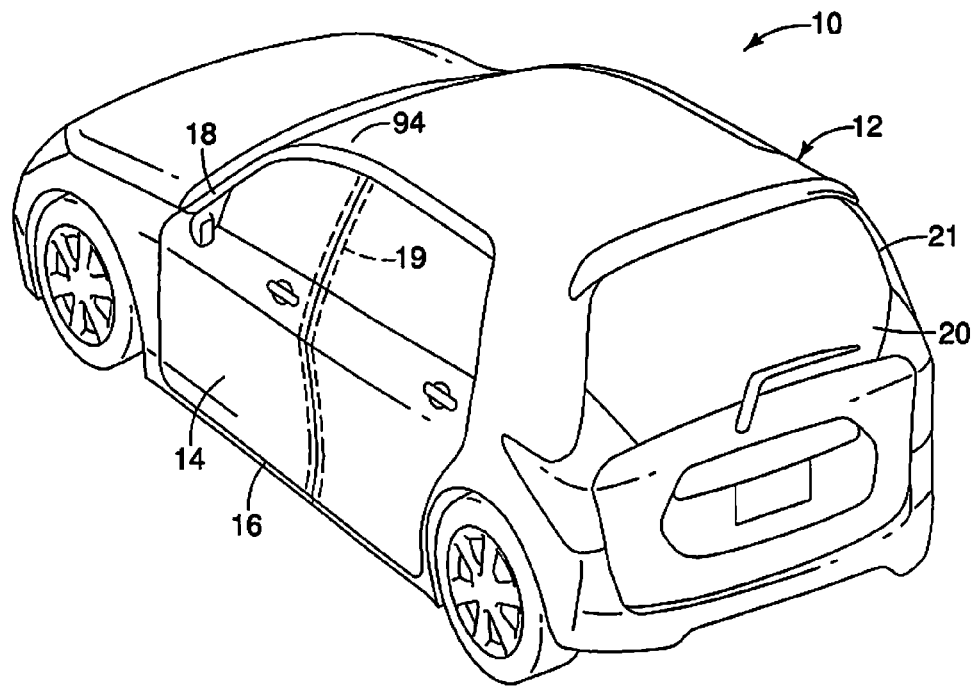
FIG. 1 is a rear perspective view of a vehicle.
Figure 3:
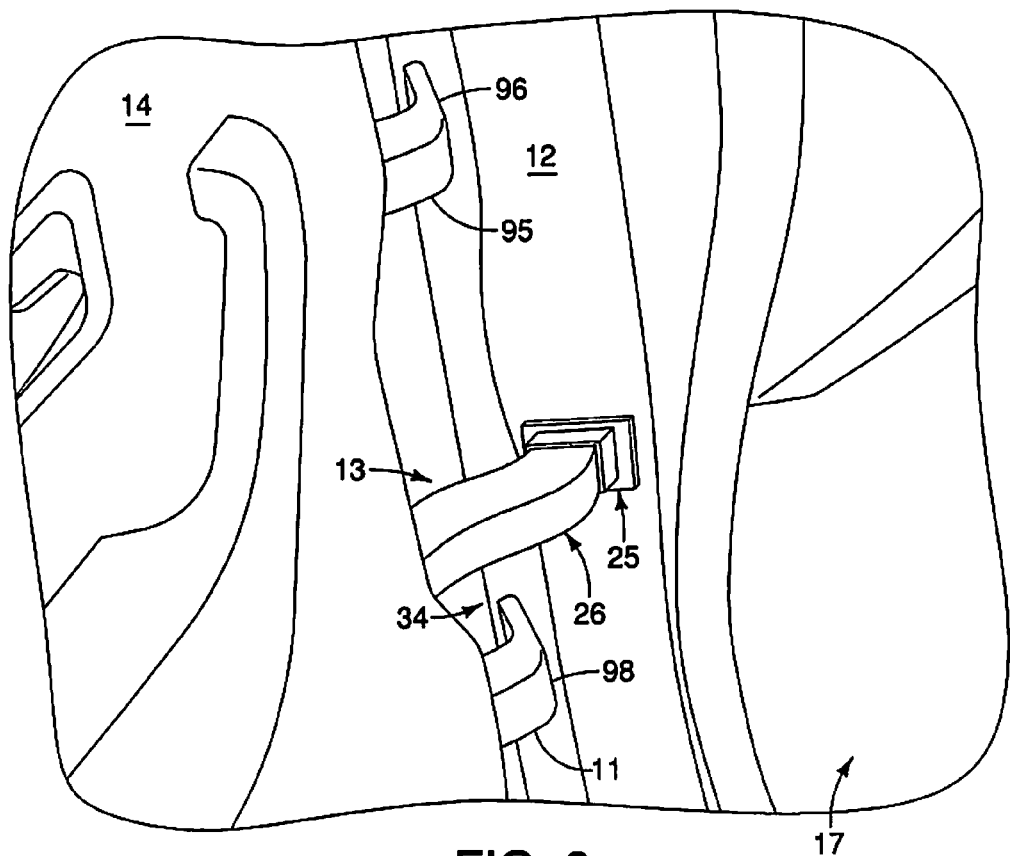
FIG. 3 is a rear perspective view of the closure panel in the open position of FIG. 2.
Figure 6:
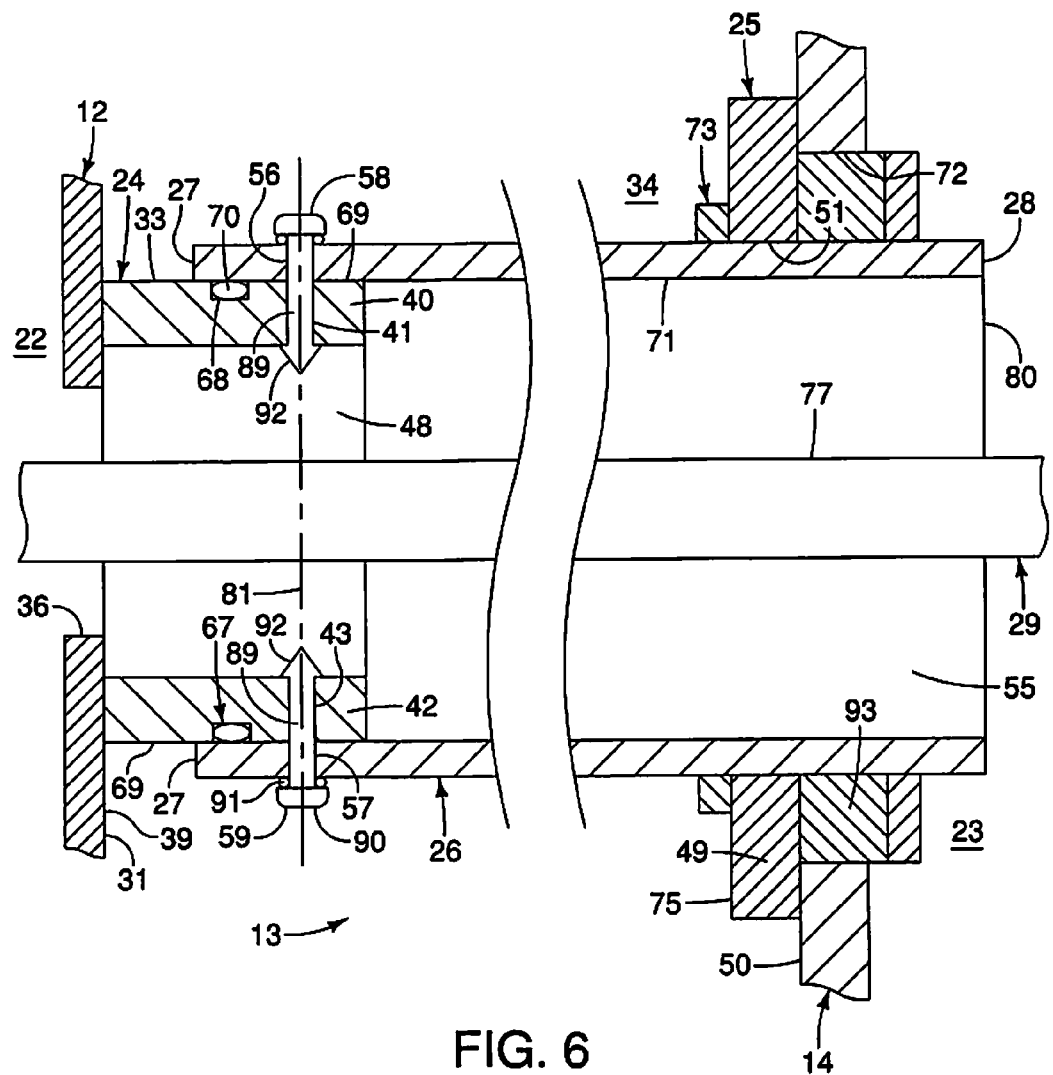
FIG. 6 is a side elevational view of the base member and the guide member receiving the channel member.

Referring initially to FIG. 1, a vehicle 10 including a vehicle body structure 12 is illustrated in accordance with an exemplary embodiment of the present invention. As shown in FIGS. 3 and 6, the vehicle 10 is provided with a check-link wiring harness guide 13, with the check-link harness guide being installed along, for example, between a closure panel 14, such as a driver-side front door, and the vehicle body structure 12, which defines an opening 15 in the vehicle body structure 12. A plurality of check-link harness guides 13 can be installed at a variety of locations between a closure panel 14 and the vehicle body structure 12.

Figure 2:
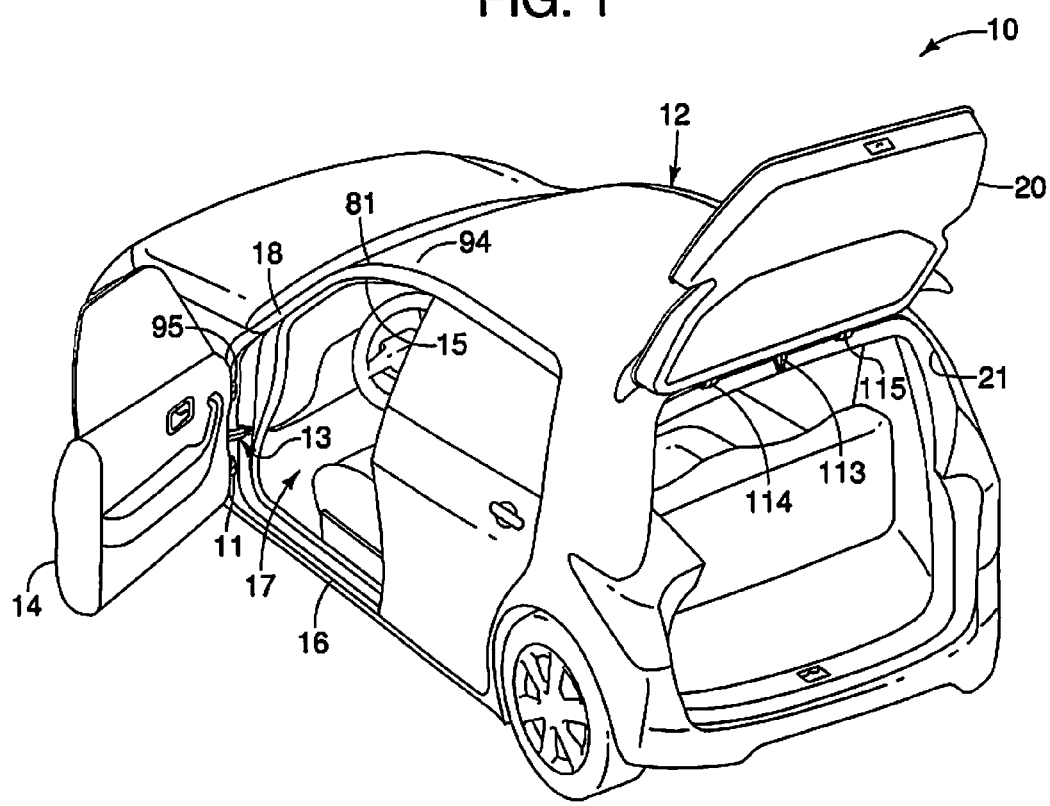
FIG. 2 is a rear perspective view of the vehicle of FIG. 1 with a closure panel in an open position.

A brief description of the vehicle 10 is now provided with specific reference to FIGS. 1 and 2. The vehicle 10 includes, among other things, a passenger compartment 17 that is at least partially defined by elements of the vehicle body structure 12. Specifically, the vehicle body structure 12 includes a sill structure 16, an A-pillar structure 18, a B-pillar structure 19 and a roof structure 94. The sill structure 16, the A-pillar structure 18, the B-pillar structure 19 and the roof structure 94 at least partially define the opening 15. The vehicle body structure 12 includes a rear sill structure and rear pillar structures defining an opening 21 closed by the hatch door 20.

The closure panel 14 is shown pivotally attached to the A-pillar structure 18 for movement between a closed position or configuration shown in FIG. 1 and an open position or configuration shown in FIGS. 2 and 3, in a conventional manner. The driver-side front door 14 is one example of a closure panel of the vehicle 10 that moves between open and closed positions. Other closure panels can include the driver-side rear door, the passenger-side front and rear doors and the hatch door 20. Additional examples of closure panels can include trunk lids, hoods, and lift gates.

Figure 4:
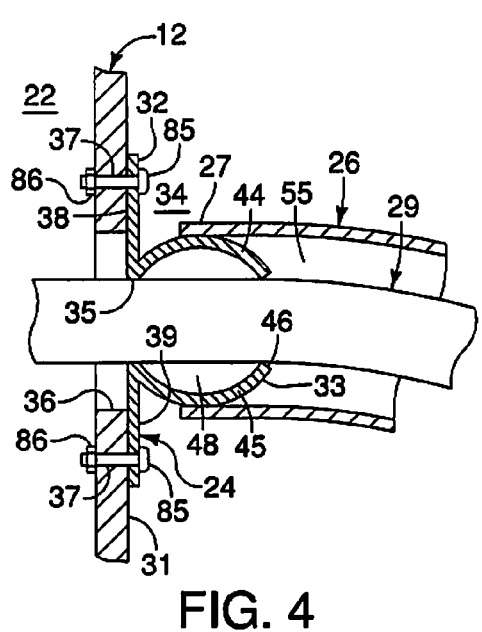
FIG. 4 is a top plan view in cross section of a base member receiving a channel member of a wiring harness guide in accordance with an exemplary embodiment of the present invention.
Figure 5:
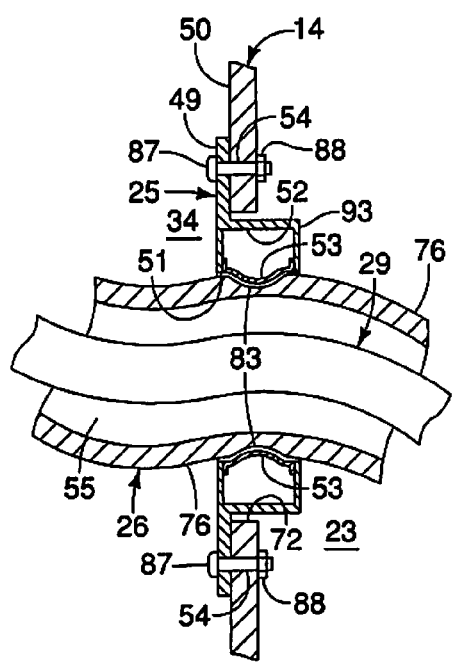
FIG. 5 is a top plan view in cross section of a guide member movably receiving the channel of the wiring harness guide.

The body structure 12 defines an interior body cavity 22 and the door opening 15, as shown in FIGS. 2 and 4. The door 14 defines an interior door cavity 23, as shown in FIG. 5. The door 14 is pivotally connected to the body structure 12, such as by hinges 11 and 95, as shown in FIG. 3. The door 14 is movable between the open position (FIGS. 2 and 3) in which the door 14 exposes the door opening 15, and a closed position (FIG. 1) in which the door 14 covers the door opening 15.

As shown in FIGS. 2 and 3, the harness guide 13 is disposed between upper and lower hinges 95 and 11, which pivotally connect the door 14 to the vehicle body structure 12. A first end 96 of the upper hinge 95 is connected to the vehicle body structure 12, as shown in FIG. 3, and a second end (not shown) is connected to the door 14. A first end 98 of the lower hinge 11 is connected to the vehicle body structure 12, as shown in FIG. 3, and a second end (not shown) is connected to the door 14. A channel member 26 and a guide member 25 of the harness guide 13 are disposed (in a vertical direction) between the upper and lower hinges 95 and 11. Another harness guide 113 can be disposed between the hatch door 20 and the vehicle body structure 12, as shown in FIG. 3. The harness guide 113 is preferably disposed between hinge members 114 and 115, as shown in FIG. 2, although the harness guide 113 can be disposed in any suitable location.

Figure 12:
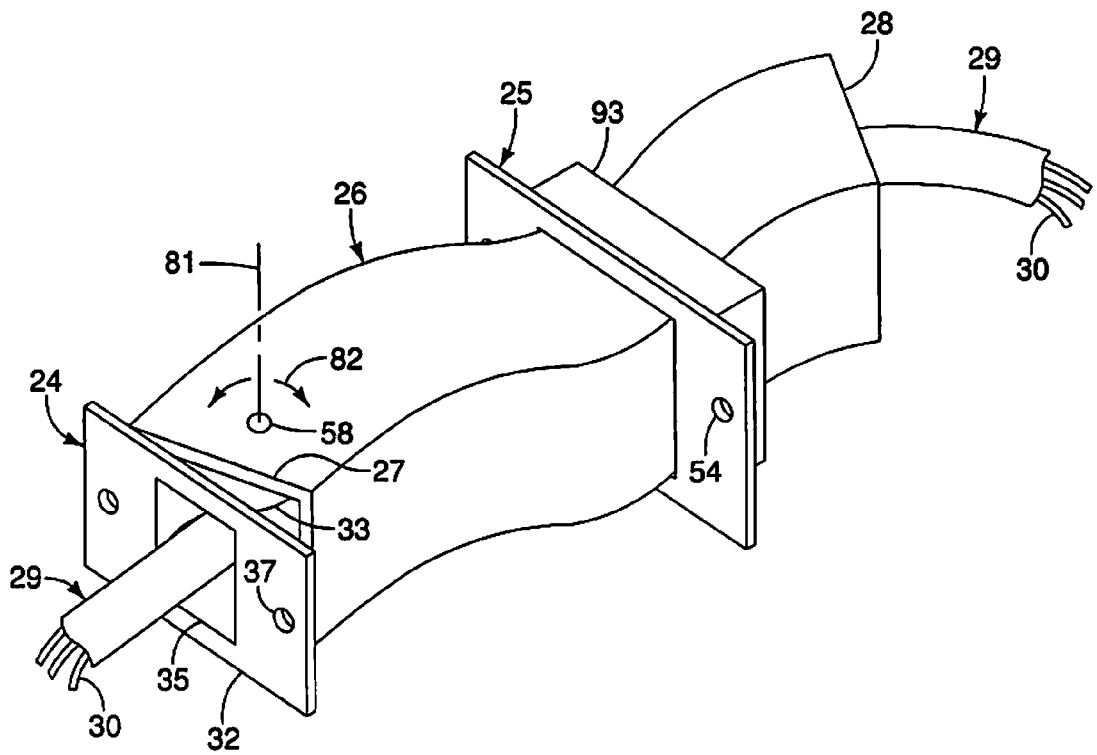
FIG. 12 is a perspective view of the wiring harness guide of FIG. 6.
Figure 13:
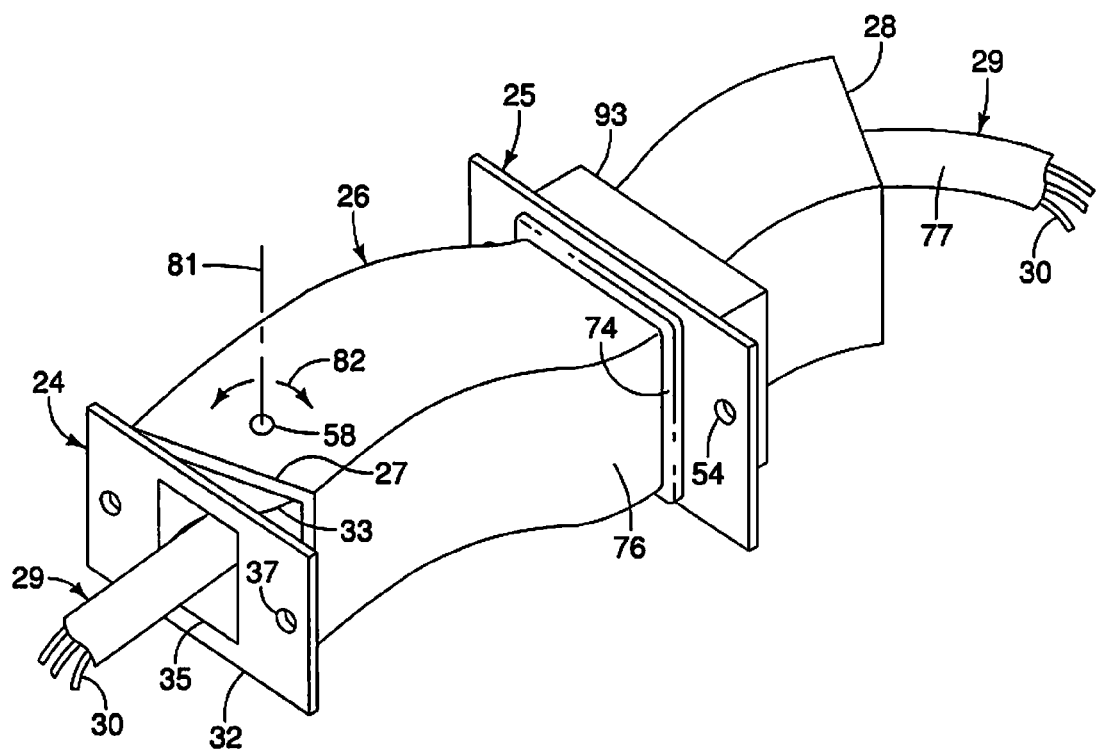
FIG. 13 is a perspective view of the wiring harness guide of FIG. 12 including a sealing structure between the guide member and the channel member.

A base member 24 is fixed to the body structure 12, as shown in FIG. 4. A guide member 25 is fixed to the door 14, as shown in FIG. 5. A channel member 26 has a first end 27 pivotally connected to the base member 24. The channel member 26 is movably received by the guide member 25 such that a second end 28 of the channel member is positioned in the interior door cavity 23. A wiring harness 29 is configured to receive electrical wiring 30 and passes through a channel 55 (FIG. 10) of the channel member 26 from the interior body cavity 22 to the interior door cavity 23, as shown in FIGS. 6, 12 and 13.

Figure 7:
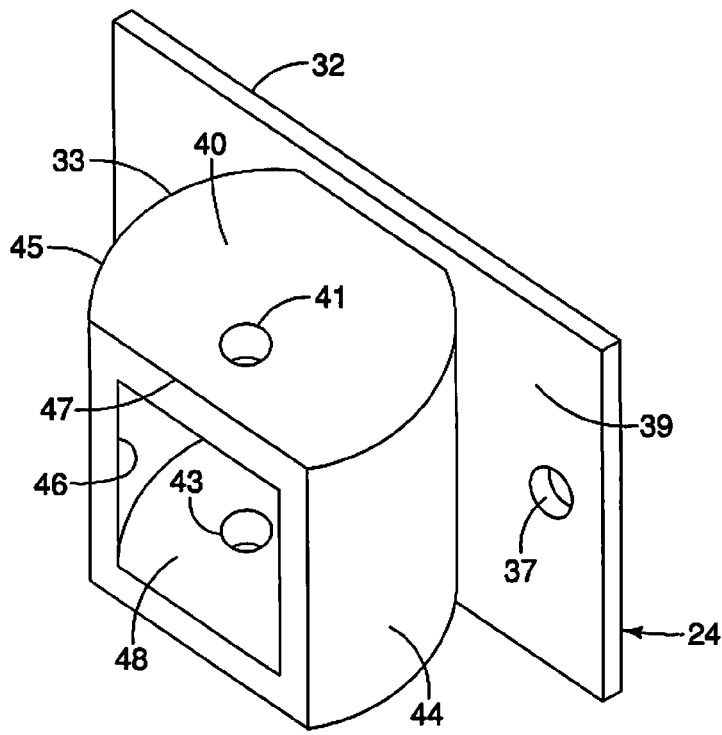
FIG. 7 is a perspective view of the base member of FIG. 4.

The base member 24 is fixed to an outer surface 31 of the body structure 12, as shown in FIGS. 4 and 7. A mounting portion 32 is fixed to the outer surface 31 of the body structure 12 in any suitable manner, such as with fasteners 85 received by fastener holes 37 in the mounting portion 32. Nuts 86 can be used to secure the fasteners 85 to the body structure 12. An inner surface 38 of mounting portion 32 faces the outer surface 31 of the body structure 12. An outer surface 39 of the mounting portion 32 faces the space 34 between the body structure 12 and the door 14, as shown in FIG. 6. A receiving portion 33 extends outwardly from the outer surface 39 of the mounting portion 32 into the space 34 between the body structure 12 and the door 14, as shown in FIG. 6. Preferably, the base member 24 is unitarily formed as a single member. An opening 35 in the base member 24 is aligned with an opening 36 in the body structure 12 to receive the wiring harness 29 therethrough.

Figure 8:
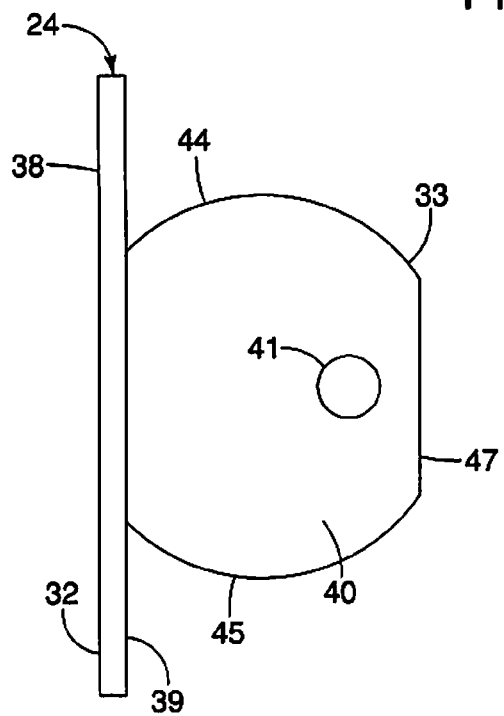
FIG. 8 is a top plan view of the base member of FIG. 7.

The receiving portion 33 of the base member 24, as shown in FIGS. 4 and 7-9, has a substantially planar upper wall 40 with an opening 41 therein. A substantially planar lower wall 42 is disposed opposite the upper wall 40 and has an opening 43 therein aligned with the upper wall opening 41. A pair of arcuate walls 44 and 45 extend outwardly from the outer surface 39 of the mounting portion 32 between the upper and lower walls 40 and 42. As shown in FIGS. 7 and 8, the arcuate walls 44 and 45 have outwardly convex shapes bowing away from each other to accommodate pivotal movement of the first end 27 of the channel member 26 relative to the receiving portion 33 of the base member 24.

Figure 9:
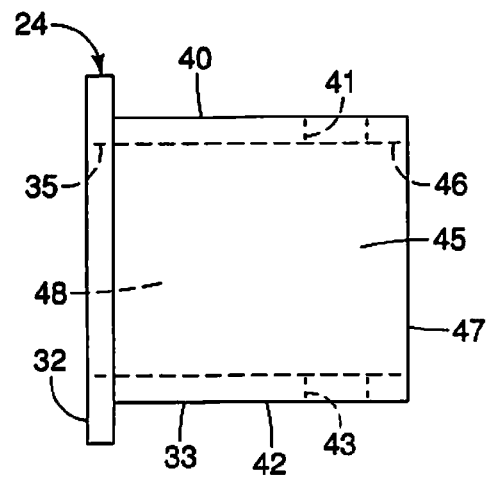
FIG. 9 is a side elevational view of the base member of FIG. 7.
Figure 14:
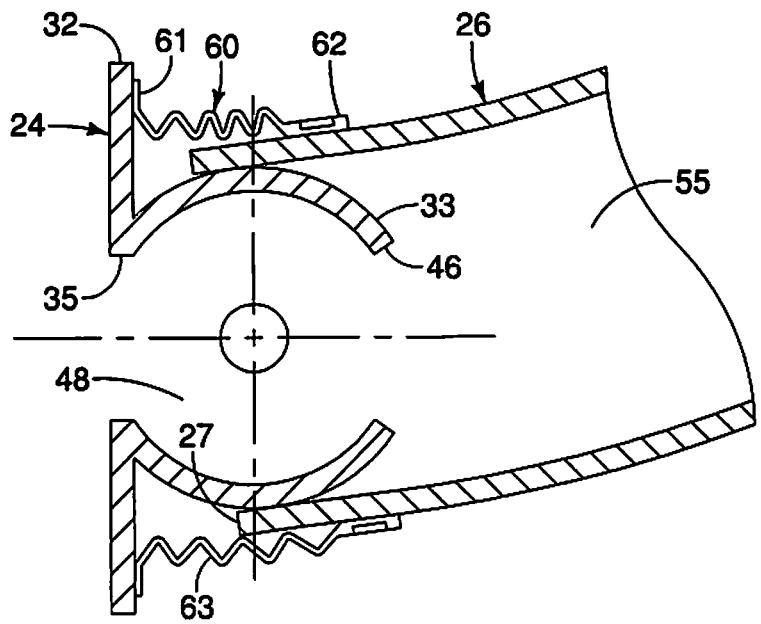
FIG. 14 is a top plan view in cross section of a sealing structure including an accordion seal member sealingly engaging the base member and the channel member.

An opening 46 is defined in a distal end 47 of the receiving portion 33, as shown in FIGS. 7 and 9. A base member channel 48 extends from the mounting portion opening 35 to the receiving portion opening 46. The base member channel 48 is in communication with the channel 55 of the channel member 26 as shown in FIG. 14, thereby allowing the wiring harness 29 to be passed therethrough.

Figure 11:
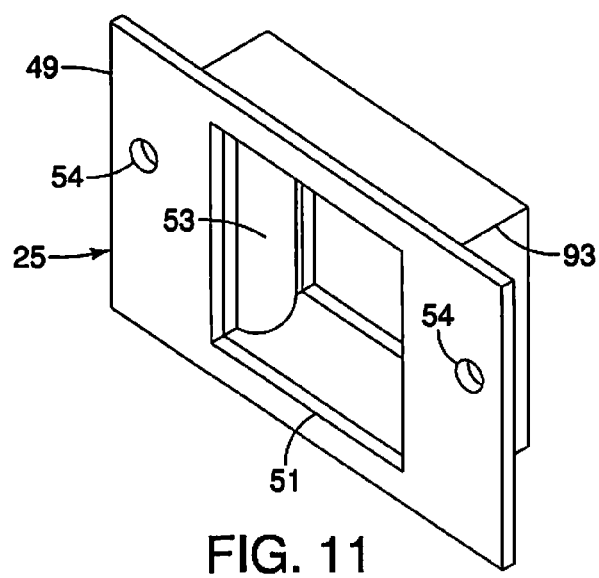
FIG. 11 is a perspective view of the guide member.

The guide member 25 is fixed to the door 14, as shown in FIG. 5. A mounting portion 49 of the guide member 25 is fixed to an outer surface 50 of the door 14 in any suitable manner, such as with fasteners 87 received by fastener holes 54 in the guide member mounting portion 49. Nuts 88 can be used to secure the fasteners 87 to the door 14. An opening 51 is defined in a receiving portion 93 the guide member 25 to receive the channel member 26, as shown in FIGS. 6 and 11. The receiving portion 93 extends through the opening 72 in the door 14, as shown in FIG. 5. A recess 52 is disposed in the opening 51 of the receiving portion 93, as shown in FIG. 5. At least one locking projection 53 is disposed in the recess 52 and biased toward the opening 51. The at least one locking projection 53 can be biased toward the opening 51 in any suitable manner, such as with a spring. The guide member opening 51 movably receives the channel member 26, thereby allowing the channel member 26 to move through the guide member 25 into the door interior cavity 23. The mounting plate 49 and the receiving portion 93 of the guide member 25 are preferably unitarily formed as a single member, and preferably made of metal. The at least one locking projection 53 is made of any suitable material, such as plastic.

Figure 10:
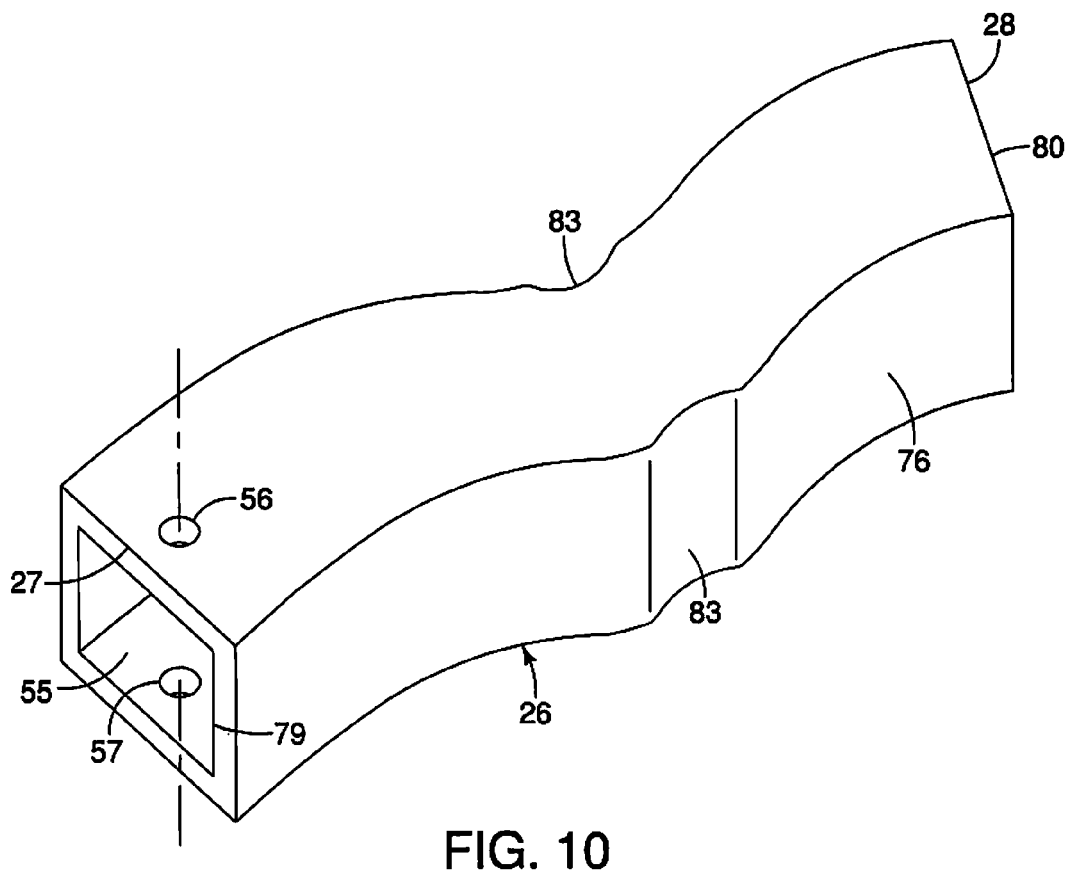
FIG. 10 is a perspective view of the channel member.

The channel member 26 has a first end 27 and a second end 28, as shown in FIG. 10. A channel 55 extends from an opening 79 at the first end 27 to an opening 80 at the second end 28 of the channel member 26 to receive the wiring harness 29 therein, as shown in FIGS. 6 and 10. The channel member 26 extends from the first end opening 79 across the space 34 and through the guide member 25, such that the second end 28 of the channel member 26 is disposed in the door interior cavity 23. The channel member 26 has a contoured profile between the first and second ends 27 and 28, as shown in FIG. 10, to accommodate movement of the channel member 26 as the door 14 moves between open and closed positions. The contour of the channel member 26 can be any suitable contour to accommodate movement of the channel member as the door 14 moves between the open and closed positions. The channel member 26 is preferably unitarily formed as a single member of a hard, substantially non-flexible material. The channel member 26 can have a square cross section as shown in FIG. 10, or any other suitable cross sectional shape, such as circular.

First and second openings 56 and 57 are disposed on opposite sides of the channel 55, as shown in FIG. 10. The first opening 56 is aligned with the upper wall opening 41 of the base member 24 and the second opening 57 is aligned with the lower wall opening 43, as shown in FIG. 6. First and second pivot structures 58 and 59, such as pins 89, are disposed through the pairs of aligned openings (56 and 41, 57 and 43) to pivotally connect the first end 27 of the channel member 26 to the base member 24. Alternatively, the pivot structures 58 and 59 can be integrally formed with the channel member 26 to be received by the upper and lower wall openings 41 and 43 of the base member 24. The pivot structures 58 and 59 provide a rotational axis 81 about which the channel member is rotatable, as indicated by arrow 82 in FIGS. 12 and 13, relative to the base member 24. The pins 89 can include a head 90 larger than the second opening 57 to prevent completely inserting the pin 89 through the second opening 57. A sealing member 91 provides a seal between the pin 89 and the channel member 26. An end 92 of the pin 89 is larger than the lower wall openings 41 and 43 to prevent withdrawal of the pin 89 from the walls 40 and 42 of the receiving portion 33. The end 92 of the pin 89 can be a flexible member than expands upon insertion to prevent withdrawal, or a clip can be connected to the end to prevent withdrawal.

At least one detent 83 is defined by an outer surface 76 of the channel member, as shown in FIGS. 5 and 10. The at least one detent 83 receives the at least one locking projection 53. The at least one detent 83 has a position corresponding to an intermediate position of the door 14 between the open position (FIGS. 2 and 3) and the closed position (FIG. 1). The at least one projection 53 is biased toward the channel member 26, such that the at least one detent 83 receives the at least one projection 53 when the door 14 is in the intermediate position. The at least one detent 83 is received by the corresponding at least one projection 53 of the guide member 25 to substantially prevent unintended movement of the door when in the intermediate position, thereby facilitating holding the door 14 in the intermediate position. The at least one detent 83 prevents movement of the at least one projection 53 out of the at least one detent unless sufficient force is imparted to the door 14 to force the at least one projection 53 out of the at least one detent 83, thereby allowing movement of the door 14 to the fully opened or the closed position. The guide member 25 guides movement of the channel member 26 through the receiving portion 93 into the interior door cavity 23.

A first sealing structure 60 sealingly engages the base member 24 and the first end 27 of the channel member 26, as shown in FIG. 14. A first end 61 of the first sealing structure 60 is connected to the mounting portion 32 of the base member 24. A second end 62 of the first sealing structure 60 is connected to the channel member 26. A flexible portion 63 is disposed between the first and second ends 61 and 62 to accommodate movement of the channel member 26. The flexible portion 63 circumscribes the receiving portion 33 of the base member 24 and the first end 27 of the channel member 26. The first sealing structure 60 substantially prevents water, dirt or other debris from entering the channel 55 of the channel member 26 through the first end opening 46 thereof.

Figure 15:
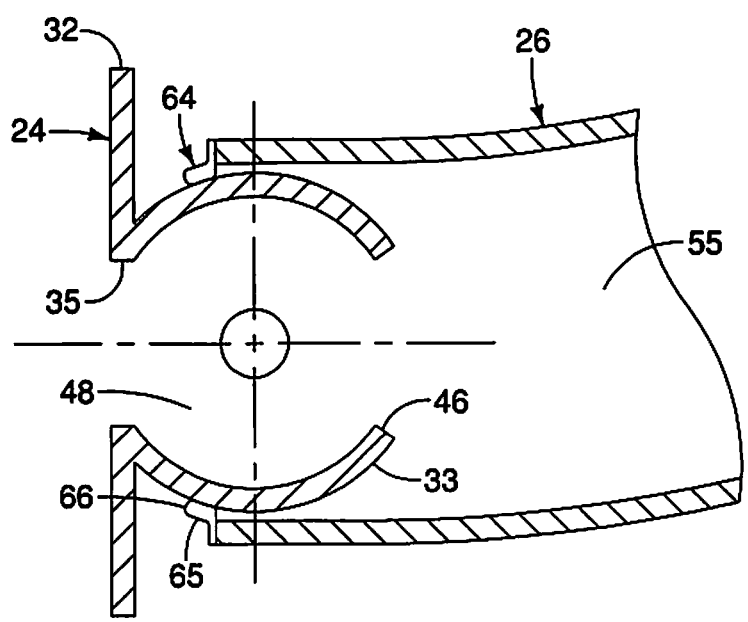
FIG. 15 is a top plan view in cross section of a sealing structure including a lip seal member sealingly engaging the base member and the channel member.
Figure 16:
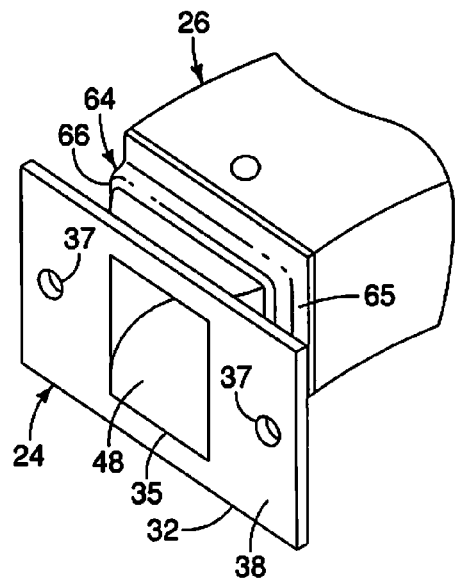
FIG. 16 is a perspective view of the sealing structure of FIG. 15.
Figure 17:
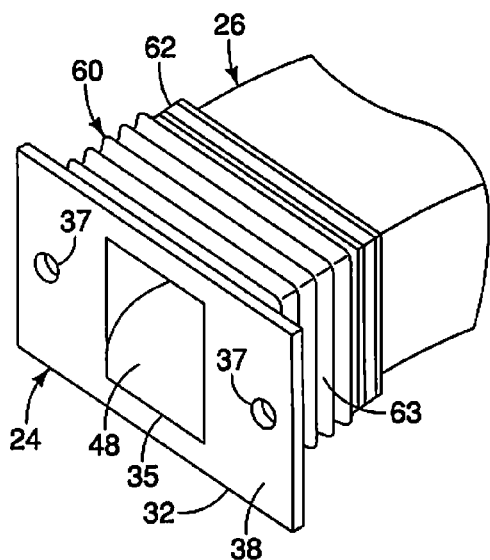
FIG. 17 is a perspective view of the sealing structure of FIG. 14.

Alternatively, a first sealing structure 64 sealingly engages the base member 24 and the first end 27 of the channel member 26, as shown in FIGS. 15 and 16. The first sealing structure 64 includes a lip seal 65 connected to and circumscribing the first end opening 46. The lip seal 65 has a distal end 66 sealingly engaging the receiving portion 33 of the base member 24. The lip seal 65 substantially prevents water, dirt or other debris from entering the interior body cavity 22.

Alternatively, a first sealing structure 67 sealingly engages the base member 24 and the first end 27 of the channel member 26, as shown in FIG. 6. The first sealing structure 67 includes an annular recess 68 disposed in an outer surface 69 of the receiving portion 33. A sealing member 70, such as an elastomeric ring, is disposed in the recess 68 and sealingly engages an interior surface 71 of the channel member 26 between the first end opening of the channel member 26 and the pivot structures 56 and 57. The sealing member 91 seals the pivot structure openings (41 and 56 in the upper wall 40, and 43 and 57 in the lower wall 42).

A second sealing structure 73 sealingly engages the guide member 25 and the channel member 26, as shown in FIGS. 6 and 13. The sealing structure 73 includes a seal member 74 disposed on an outer surface 75 of the guide member 25 and the outer surface 76 of the channel member 26. The second sealing structure 73 is disposed in the space 34 between the base member 24 and the guide member 25. Accordingly, the second sealing structure 73 seals the guide member 25 to the external surface 76 of the channel member 26, thereby substantially preventing water, dirt or other debris from entering the interior door cavity 23.

Figure 18:
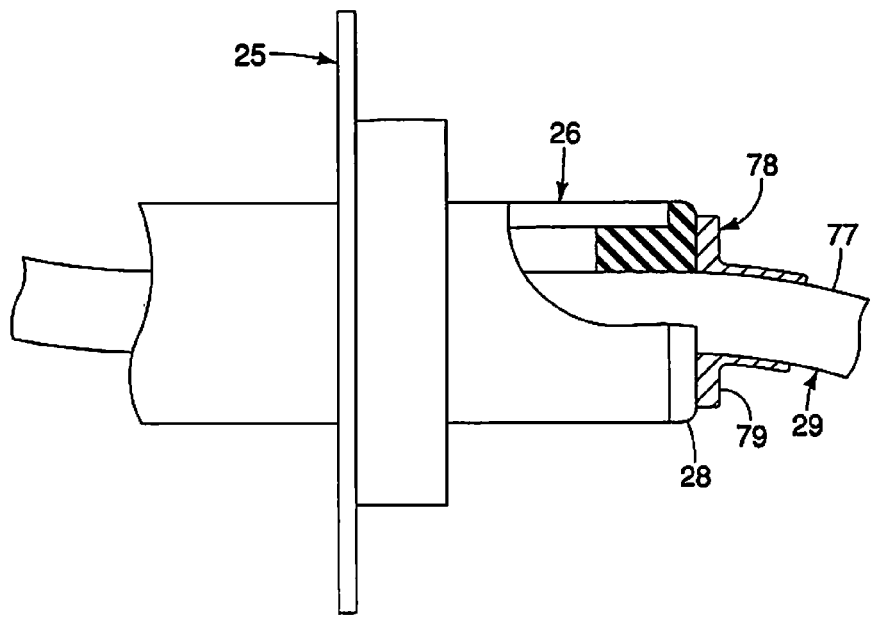
FIG. 18 is a side elevational view of a sealing structure sealingly engaging the channel member and the wiring harness.

Alternatively, as shown in FIG. 18, a second sealing structure 78 sealingly engages the channel member 26 and the wiring harness 29. The second sealing structure 78 includes a grommet 79 disposed between the second end 28 of the channel member 26 and an outer surface 77 of the wiring harness 29. Accordingly, the second sealing structure 78 seals the second end 28 of the channel member 26 to the external surface 77 of the wiring harness 29, thereby substantially preventing water, dirt or other debris from entering the channel member 26.

The electrical wires 30 (FIGS. 12 and 13) extend from a power source to the electrical accessories through the wiring harness 29. As shown in FIG. 6, the wiring harness passes from the door interior cavity 23 through the channel 55 in the channel member 26 and through the base member channel 48 into the body interior cavity 22. The channel member 26 is pivotally connected to the base member 24 at the first end 27, with the second end 28 of the channel member disposed in the door interior cavity 23. The receiving portion 33 of the base member 24 is received within the first opening 27 of the channel member 26.

When the door 14 is moved to the open (FIGS. 2 and 3) or closed (FIG. 1) positions, the pivot structures 58 and 59 allow the channel member 26 to pivot as a portion of the channel member passes through the guide member 25 to accommodate the opening of the door 14. The arcuate walls 44 and 45 of the receiving portion 33 of the base member 24 accommodate the pivotal movement of the channel member 26 thereon. The channel member 26 pivots relative to the base member 24 about axis 81, as indicated by arrow 82 in FIGS. 12 and 13. The contour of the channel member 26 facilitates movement of the channel member 26 through the guide member 25. The channel member 26 has a length to span the distance between the base member 24 and the guide member 25 when the door 14 is in the open position without the second end 28 of the channel member 26 being drawn through the guide member 25. The base member 24 and the guide member 25 are disposed at substantially the same height to facilitate movement of the channel member 26 when the door 14 is moved between closed and open positions.

In another exemplary embodiment of the present invention, the guide member 25 is connected to the body structure 12 and the base member 24 is connected to the door 14, such that the channel member 26 passes through the guide member 25 connected to the body structure. The operation of the check-link harness is substantially similar to the operation described above.

Accordingly, the check-link harness guide 13 in accordance with the exemplary embodiments of the present invention substantially prevents the wiring harness 29 from being pinched between the body structure 12 and the door 14.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a first body structure defining a first interior cavity;
   a second body structure defining a second interior cavity, with one of the first and second body structures being pivotally connected and movable relative to the other of the first and second body structures to define an open configuration and a closed configuration;
   a base member having a mounting portion and a receiving portion extending from the mounting portion, the mounting portion being fixed to the first body structure;
   a guide member fixed to the second body structure;
   a channel member movably received by the guide member, the channel member having a first end rotatably fixed to the receiving portion of the base member and defining a first end opening such that the receiving portion of the base member extends into the first end opening, and a second end positioned within the second interior cavity and defining a second end opening with a channel extending from the first end opening to the second end opening, the channel member extending across an exterior space between the first and second body structures; and
   a wiring harness passing through the channel of the channel member from the first interior cavity to the second interior cavity.

2. The vehicle body structure according to claim 1, wherein
a pivot structure rotatably connects the first end of the channel to the receiving portion of the base member.

3. The vehicle body structure according to claim 2, wherein
the receiving portion of the base member has a substantially flat upper wall with a first pivot of the pivot structure connected to the upper wall, a substantially flat lower wall with a second pivot connected to the lower wall in axial alignment with the first pivot, and a pair of arcuate side walls to accommodate pivotal movement of the first end of the channel member relative to the receiving portion of the base member.

4. The vehicle body structure according to claim 3, wherein
each of the first and second pivots is a pin disposed through the receiving portion and the channel member.

5. The vehicle body structure according to claim 3, wherein
the first and second pivots are integrally formed with the channel member.

6. The vehicle body structure according to claim 4, wherein
a sealing member is disposed between each of the first and second pivots and the outer surfaces of the upper and lower walls, respectively.

7. The vehicle body structure according to claim 1, further comprising
a first sealing structure sealingly engaging the base member and the first end of the channel member; and
a second sealing structure configured to provide a seal between the guide member and the channel member.

8. The vehicle body structure according to claim 1, wherein
the channel member has a contoured profile between the first and second ends to accommodate movement of the channel member with the one of the first and second body structures between the closed and open configurations.

9. The vehicle body structure according to claim 1, wherein
the guide member defines an opening configured to receive the channel member, and a recess within the opening, and at least one locking projection positioned in the recess and biased toward the opening.

10. The vehicle body structure according to claim 9, wherein
an external surface of the channel member defines at least one detent corresponding to an intermediate configuration between the open configuration and the closed configuration, with the locking projection extending into the at least one detent when the one of the first body structure and the second body structure is in the intermediate configuration.

11. The vehicle body structure according to claim 1, wherein
the second body structure defines an opening, and the first body structure is a closure panel movable relative to the second body structure to define the open configuration, in which the closure panel exposes the opening, and the closed configuration, in which the closure panel covers the opening.

12. The vehicle body structure according to claim 1, wherein
the first body structure defines an opening, and the second body structure is a closure panel movable relative to the first body structure to define the open configuration in which the closure panel exposes the opening, and the closed configuration in which the closure panel covers the opening.

13. A vehicle body structure, comprising:
a body structure defining an interior body cavity and a door opening;
a door structure defining an interior door cavity, the door pivotally connected to the body structure and movable between an open position in which the door exposes the door opening, and a closed position in which the door covers the door opening;
a base member having a mounting portion fixed to the body structure, and a receiving portion extending from the mounting portion, the receiving portion of the base member having a substantially flat upper wall, a substantially flat lower wall, and a pair of arcuate side walls;
a guide member fixed to the door structure;
a channel member rotatably fixed to the receiving portion of the base member and movably received by the guide member, the channel member having a first end defining a first end opening, with the receiving portion of the base member extending into the first end opening such that the pair of arcuate side walls accommodate pivotal movement of the first end of the channel member relative to the receiving portion of the base member, and a second end positioned within the interior door cavity and defining a second end opening, with a channel extending from the first end opening to the second end opening, the channel member extending across an exterior space between the body and door structures;
a wiring harness passing through the channel of the channel member from the interior body cavity to the interior door cavity; and
a pivot structure rotatably connecting the first end of the channel to the receiving portion of the base member.

14. The vehicle body structure according to claim 13, wherein
the pivot structure has a first pivot and a second pivot, the first pivot being connected to the upper wall, the second pivot being connected to the lower wall in axial alignment with the first pivot.

15. The vehicle body structure according to claim 14, wherein
each of the first and second pivots is a pin disposed through the receiving portion of the base member and the channel member.

16. The vehicle body structure according to claim 15, wherein
the first and second pivots are integrally formed with the channel member.

17. The vehicle body structure according to claim 15, wherein
a sealing member is disposed between each of the first and second pivots and the outer surfaces of the upper and lower walls, respectively.

18. The vehicle body structure according to claim 13, further comprising
a first sealing structure sealingly engaging the base member and the first end of the channel member; and
a second sealing structure configured to provide a seal between the guide member and the channel member.

19. The vehicle body structure according to claim 13, further comprising a sealing structure disposed in the exterior space between the first and second body structures and sealing the second end of the channel member to an external surface of the wiring harness.

20. The vehicle body structure according to claim 15, wherein the channel member has a contoured profile between the first and second ends to accommodate movement of the channel member with the one of the first and second body structures between the closed and open configurations.

\* \* \* \* \*